(12) United States Patent
Soelberg et al.

(10) Patent No.: US 8,494,496 B2
(45) Date of Patent: Jul. 23, 2013

(54) SYSTEM AND METHOD FOR USING CELLULAR NETWORK COMPONENTS TO DERIVE TRAFFIC INFORMATION

(75) Inventors: Emily Lyons Soelberg, Atlanta, GA (US); Michael J. Berry, Jr., Monroe, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 420 days.

(21) Appl. No.: 12/618,291

(22) Filed: Nov. 13, 2009

(65) Prior Publication Data

US 2011/0117896 A1    May 19, 2011

(51) Int. Cl.
*H04M 3/42*    (2006.01)

(52) U.S. Cl.
USPC .................................... 455/414.1; 455/456.1

(58) Field of Classification Search
USPC .................... 455/414.1, 456.1; 701/117–119, 701/200–202, 300
See application file for complete search history.

(56) References Cited

U.S. PATENT DOCUMENTS

| | | | | |
|---|---|---|---|---|
| 7,912,627 | B2* | 3/2011 | Downs et al. ................. | 701/117 |
| 2005/0272413 | A1* | 12/2005 | Bourne ......................... | 455/415 |
| 2006/0031003 | A1* | 2/2006 | Sun et al. ...................... | 701/117 |
| 2007/0038360 | A1* | 2/2007 | Sakhpara ...................... | 701/117 |
| 2007/0162328 | A1* | 7/2007 | Reich ............................ | 705/14 |
| 2008/0071465 | A1* | 3/2008 | Chapman et al. ............. | 701/117 |
| 2009/0271101 | A1* | 10/2009 | Relyea et al. ................. | 701/118 |
| 2012/0035839 | A1* | 2/2012 | Stehle et al. .................. | 701/117 |

OTHER PUBLICATIONS

Beale (IEEE CS, 2005, Supporting Social Interaction with Smart Phones) pp. 35-41.*
Aalto et al. (MobiSys'04. Jun. 2004, ACM 1-58113-793-1/04/0006); Bluetooth and WAP push based Location aware Mobile Advertising System. pages 49-58.*
Broll et al. (May 15, 2007); Modelling Context Information for Realizing Simple Mobile Services.*
Li et al. (Jul. 2009) 10.4108/ICST.MOBIQUITOUS2009.6828; Multilayered Friendship Modeling Location based Mobile Social Networks.*
Paireekreng et al. (Jul. 15, 2009, Eight International Symposium on Natural Language Processing); Client-side Mobile User profile for Content Management Using Data Mining Techniques; pp. 96-100.*
Pak et al. (UIC 2007) pp. 1130-1139; Location based recommendation system using bayesian users preference model in mobile devices.*
Ali et al. (CSTST, Oct 2008); Context Aware Mobile Muslim Companion; pp. 553-558.*
Viljamaa et al. (MobileHCI'05, Sep. 2005) Creation and Application of Media Design Drivers;; pp. 247-250.*

* cited by examiner

*Primary Examiner* — Manpreet Matharu
(74) *Attorney, Agent, or Firm* — Woodcock Washburn LLP

(57) ABSTRACT

A traffic reporting system and method for geographic area of interest. The system includes standard wireless telecommunication components configured to establish search criteria, determine a sample size, collect traffic information, calculate additional traffic information, and generate reports.

16 Claims, 6 Drawing Sheets

__US 8,494,496 B2__

SYSTEM AND METHOD FOR USING CELLULAR NETWORK COMPONENTS TO DERIVE TRAFFIC INFORMATION

TECHNICAL FIELD

The technical field generally relates to wireless communications and more specifically relates to the use of cellular network data to derive traffic information for use in reporting and other location-based services.

BACKGROUND

There are several proposed methods for determining automobile and pedestrian traffic data by aggregating cell phone data on location, speed and direction. Several companies have developed methods for taking raw data and interpreting them, for example, Intellione, whose brochures located on www.intellione.com, state that for each second, Io-traffic™ collects and aggregates millions of GPS and mobile phone locations, creates road speeds, then paints a live picture of traffic conditions in a geographic area. Such a method requires an incredible amount of data collection and analysis. Moreover, after collecting such data, it is limited in its usefulness as it relates only to traffic issues.

There are other methods for determining traffic flow such as network probes which monitor voice data as it passes through the network and other methods which involve installing "sniffers" into the core radio infrastructure (BSC/RNC). Device probes can be programmed to send location/direction/speed data to a central database on certain intervals. These all have drawbacks. Network probes are expensive. Infrastructure enhancements will take years to bring to market. Device probes are unreliable for "ad hoc" demands for a particular area and are battery and network intensive and often end up generating data that isn't used or useful.

SUMMARY

This proposed invention is a method for deriving aggregated real time automobile and pedestrian traffic data by using AT&T network components to isolate specific handsets to determine location and travel information. The method for generating a traffic report includes the steps of selecting a geographic area of interest, establishing search criteria, collecting traffic information based on the establishing step, calculating traffic data from the collected traffic information, and generating a traffic report from the calculated traffic data. The method may further include determining a sample size for the collecting step wherein the sample size is determined automatically based on the total volume of traffic information available. The search criteria may be based upon demographic data. The report may include advertising based at least in part on the demographic data. The search criteria may be based upon a travel direction. The report include may include advertising. The generation of a traffic report may be based on receiving a request for a traffic report and the selecting, establishing, collecting, calculating and generating steps are performed in response to the receiving step. The traffic data may be compared to historical traffic data such that traffic report includes comparative traffic data.

According to another embodiment of the invention, there is a method for generating a traffic report, including receiving a request for the traffic report from a mobile handset, wherein the request includes a geographic area and search criteria, collecting traffic information based on the receiving step, calculating traffic data from the collected traffic information, generating a traffic report from the calculated traffic data, and delivering the traffic report to the mobile handset. The collecting step may be based on demographic data and the traffic report may include advertising based at least in part on the traffic report.

According to another embodiment of the invention, there is a method of generating a traffic report, including selecting a mobile handset for tracking purposes; collecting location information for that handset at selected time intervals, calculating a speed and direction which the handset is traveling, comparing the speed and direction with historical data, and generating a traffic report based on the calculating and comparing steps.

BRIEF DESCRIPTION OF THE DRAWINGS

The following description is better understood when read in conjunction with the appended drawings.

DESCRIPTION OF ILLUSTRATIVE EMBODIMENTS

The present invention uses several mobile communications network components to isolate selected cellular mobile devices to be located to determine traffic information and traffic flow to fulfill the demand for information while minimizing network load. The invention takes advantage of existing hardware and does not require build-out of new tools such as network probes or adding to the RAN infrastructure.

In a preferred embodiment, a market would be selected that defines an area to be covered. For example, a carrier may choose to cover the top ten or twenty markets first, then roll out the service to secondary markets after that. In accordance with another embodiment, the area to be covered may be based on customer request(s) and the data for a particular region may be assimilated, processed and delivered.

Using the home location register (HLR), which tracks which cell sites each phone is registered, and the VCIDDB (Virtual Cell ID Database) which is a database of latitude/longitude coordinates and ranges for the cell sites in the network, the system is able to determine a list of mobile devices that are connected to cell sites for a particular area. Those mobile devices may then have their location information queried by a mechanism such as the location API gateway which may access such information off the Gateway Mobile Location Center (GMLC) including the mobile device's latitude and longitude, speed and direction of travel. It is possible, depending on the network load, to gather that location information either for all the mobile devices in the geographic area or for a statistically significant sample of such mobile devices. The gathering of such data may be done ad hoc or at a particular interval or at variable intervals, for example, perhaps every ten minutes during rush hour, and perhaps every thirty minutes outside of rush hour. The location, speed, and direction information could then be interpreted into user-valuable information, such as the determination of traffic speed on S.R 400 at Exit 7 north of Atlanta at the particular time of inquiry. Additionally, the location, speed, and direction data may include comparative data from prior time periods. For example, the information provided for traffic speed on S.R. 400 at Exit 7 at 6:00 pm could be compared to that at the same location at 5:00 pm to see if traffic is moving faster or slower at that time, or compared to an average speed at that time. Moreover, if traffic is deviating from the average speed, an alert may be sent to the subscriber indicating that deviation from average so that the subscriber may choose a route based on the traffic information.

Figure 1:
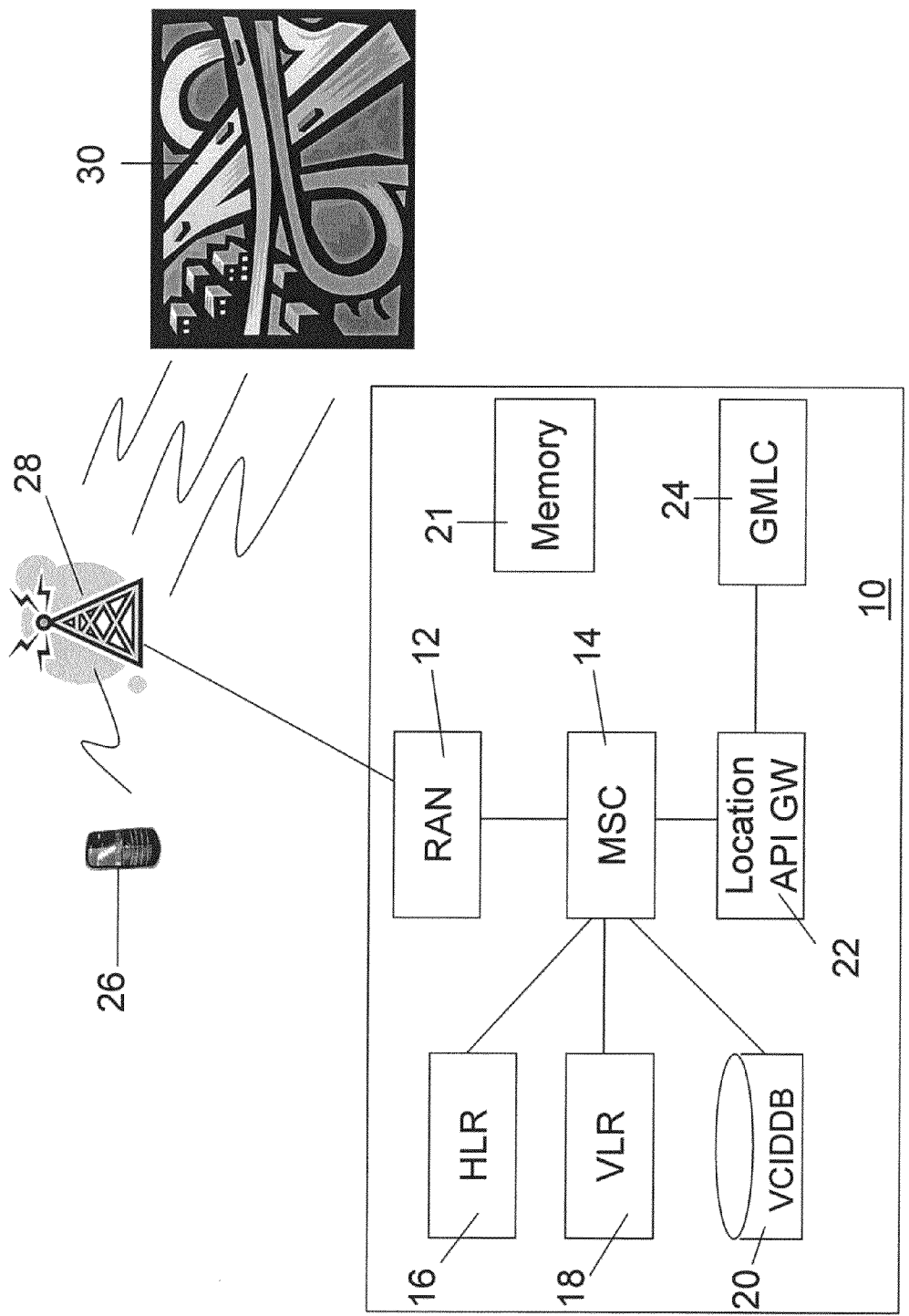
FIG. 1 is a block diagram of an example embodiment of a system constructed in accordance with the present invention.

With reference to FIG. 1, there is shown an exemplary system 10 for implementing a traffic information gathering and reporting system. The system 10 includes a Radio Access Network (12), typically including a BTS and BSC (shown as BTS 764 and BSC 766 in FIG. 5) in communication with a mobile switching center 14, and a cellular tower 28, including a transmission/receive antenna. The MSC 14 is in data communication with the Home Location Register (HLR) 16, the Visitor Location Register (VLR) 18, and the VCIDDB data base 20. The MSC 14 is also in communication with the Location API Gateway 22 which is in communication with the Gateway Mobile Location Center (GMLC) 24. The system 10 may also have one or more memory modules or memory devices for storing interim data, historical data, or any other data requiring such storage.

The mobile device 26 is representative of any appropriate type of device that can communicate on a wireless network. Example mobile devices include any type of wireless receiver or transceiver device with broadcast reception capabilities (e.g., cell phone, pager, PDA, PC, specialized broadcast receiving device, first responder Mobile Data Terminal (MDT), FM/AM radio, NOAA weather radio, Land Mobile Radio (LMR), satellite radio receiver, satellite phone, and television). Example devices can comprise any appropriate mobile device, such as, for example, a portable device, a variety of computing devices including (a) a portable media player, e.g., a portable music player, such as an MP3 player, a Walkman, etc., (b) a portable computing device, such as a laptop, a personal digital assistant ("PDA"), a portable phone, such as a cell phone or the like, a smart phone, a Session Initiation Protocol (SIP) phone, a video phone, a portable email device, a thin client, a portable gaming device, etc., (c) consumer electronic devices, such as TVs, DVD players, set top boxes, monitors, displays, etc., (d) a public computing device, such as a kiosk, an in-store music sampling device, an automated teller machine (ATM), a cash register, etc., (e) a navigation device whether portable or installed in-vehicle and/or (f) a non-conventional computing device, such as a kitchen appliance, a motor vehicle control (e.g., steering wheel), etc., or a combination thereof.

The mobile device 26 is in wireless communication with the system 10 through the cellular tower 28 in accordance with protocols as known by those skilled in the art. The cellular tower 28 has an antenna whose radio coverage is typically tuned to a specific geographic area, for example, a roadway or interchange 30 as shown in FIG. 1. As will be understood by those skilled in the art, it should be noted that while only one cellular tower 28 is shown for one section of the roadway or interchange 30, there need not necessarily be a one-to-one correspondence in that multiple cellular towers may cover one area of highway and one cellular tower may cover multiple highways.

As vehicles travel on the roadway 30, mobile devices that are traveling in those vehicles which may be similar to mobile device 26 are in communication with cellular tower 28. As such, the system 10 is able to identify information about the mobile devices, including such information as identifiers (MSIDN, MIN, etc), latitude/longitude location, time of day, subscriber information, including demographic data, mobile device characteristics, and other information about the mobile device or the subscribers associated with that mobile device. The system 10 is also able to determine loading on the system 10 and other indices of system performance. Moreover, the system 10 is able to calculate additional data from that gathered information, such as direction of travel, speed of travel and so forth of the mobile devices.

Figure 2:
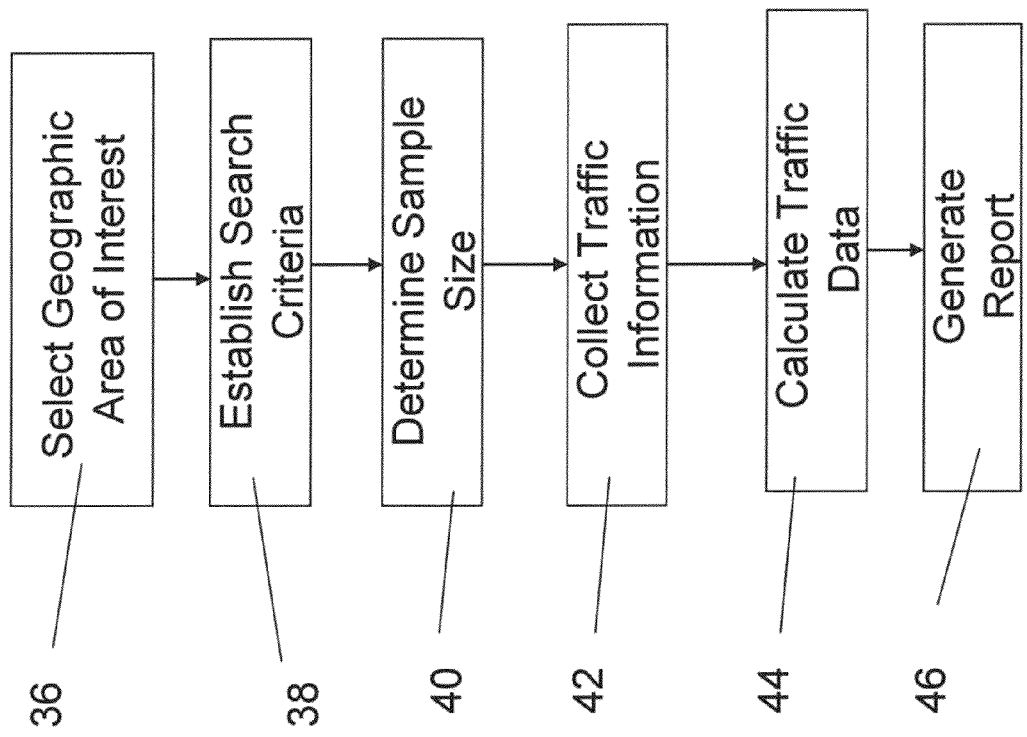
FIG. 2 is a flow diagram of an example process for collecting, analyzing and reporting traffic information in accordance with the present invention.

With reference to FIG. 2, there is shown an exemplary process for collecting and distributing traffic information. At step 36, a geographic area of interest is determined. At step 38, search criteria is established. For example, the search criteria may be all mobile devices headed north between 4:00 and 5:00 pm on a particular highway, or it may be the total volume and average speed of all mobile devices in the geographic area. Still another alternative criteria may include demographic data, for example, how many women are in the geographic area based on subscriber information or how many users are in their 20's. Next, at step 40, a sample size is determined. If there are hundreds or thousands of cars in or passing through the geographic area, perhaps only a statistically significant sample of data needs to be collected. Alternatively, there may be occasions wherein only one mobile device is tracked to determine the speed of one vehicle in the geographic area. Any number of search criteria may be applied in any number of ways and a sample size from one to all may be selected for any particular application. Continuing at step 42, the traffic information is collected. Such traffic information is collected through the cellular antenna 28 serving the roadway 30 as is known by those skilled in the art. At step 44, additional traffic information is calculated by the system 10 and reports are generated at step 46.

In operation, the traffic data is collected through the cellular tower 28. The raw traffic data including mobile identification numbers and latitude/longitude of the mobile devices (if known) is then passed on through the RAN 12 to the MSC 14. The MSC 14 may then determine the location of the mobile device generating that raw traffic data in a number of ways. For example, using the HLR 16, the MSC 14 knows which of a plurality of cellular towers 28 are servicing the mobile device and through the VCIDDB database, the MSC 14 knows the location of each of the cellular towers 28. Thus the MSC 14 or an associate processor (not shown) is able to determine the location of the device. Additional use may be made of the Location API Gateway 22 and the GMLC 24 to determine the location of the mobile device. Keeping a history of these data points as they are associated with a particular mobile device then provides a speed and direction through which the mobile device is moving through the geographic area. This process is performed for each of the mobile devices that are selected for both meeting the criteria and are within the sample size as set forth above. For historical reference, the real-time data being collected and calculated may be compared to data stored in memory 21.

Exemplary reports may include a report on the average speed through a roadway or interchange in each of multiple directions, a report on the time it takes to pass through a section of a roadway or interchange, a report on the amount of delay compared to an average delay time for a section of a roadway or an interchange, or any other type of report that conveys such traffic information. The reports may be in the form of automatic alerts, responses to requests for information, text messages, MMS messages, be presented through web browsers, or any other compatible form and format.

Additional services may be provided in accordance with the principles of the present invention. For example, if traffic is moving slower than normal at a particular section of a roadway or interchange, businesses or other establishments along that roadway or interchange may send out alerts, advertisements or coupons to lure potential customers off the roadway or interchange and into their establishments. Such messages may be targeted based on the geographic data or may be targeted based on demographic data of the users of the mobile devices in the geographic area or a combination thereof. Likewise, if traffic is moving faster than normal, businesses or other establishments that may send messages to those who will arrive in the future, but sooner than normal, about specials or other offers. Again, messages may be targeted based on the geographic data or may be targeted based on demographic data of the users of the mobile devices in the geographic area or a combination thereof. These are but a few examples of the additional services that may be offered and are not meant to limit the invention thereby.

Mobile device 26 may be a passive receiver of traffic information, may be a subscriber to traffic information and thus receive traffic information passively or upon request, or it may be an active requester of traffic information. If user of the mobile device 26 is traveling in an unfamiliar part of the country, the user may elect to request traffic information for the nearest city, town or village. In that case, the system 10 may be determining traffic information on a regular basis and simply forward the requested reports to the mobile device 26. Alternatively, the system 10 may not currently be determining traffic information, but based on the request from mobile device 26, the system 10 will begin to generate the traffic data as a result of that user request and provide the requested report to the mobile device 26.

Similar concepts as described above may be used for foot traffic in smaller places, for example in a mall area, a downtown street, a multi-venue concert forum, or any other place where it would be convenient to know the speed and location of crowd movements and the demographics associated with those movements.

Figure 3:
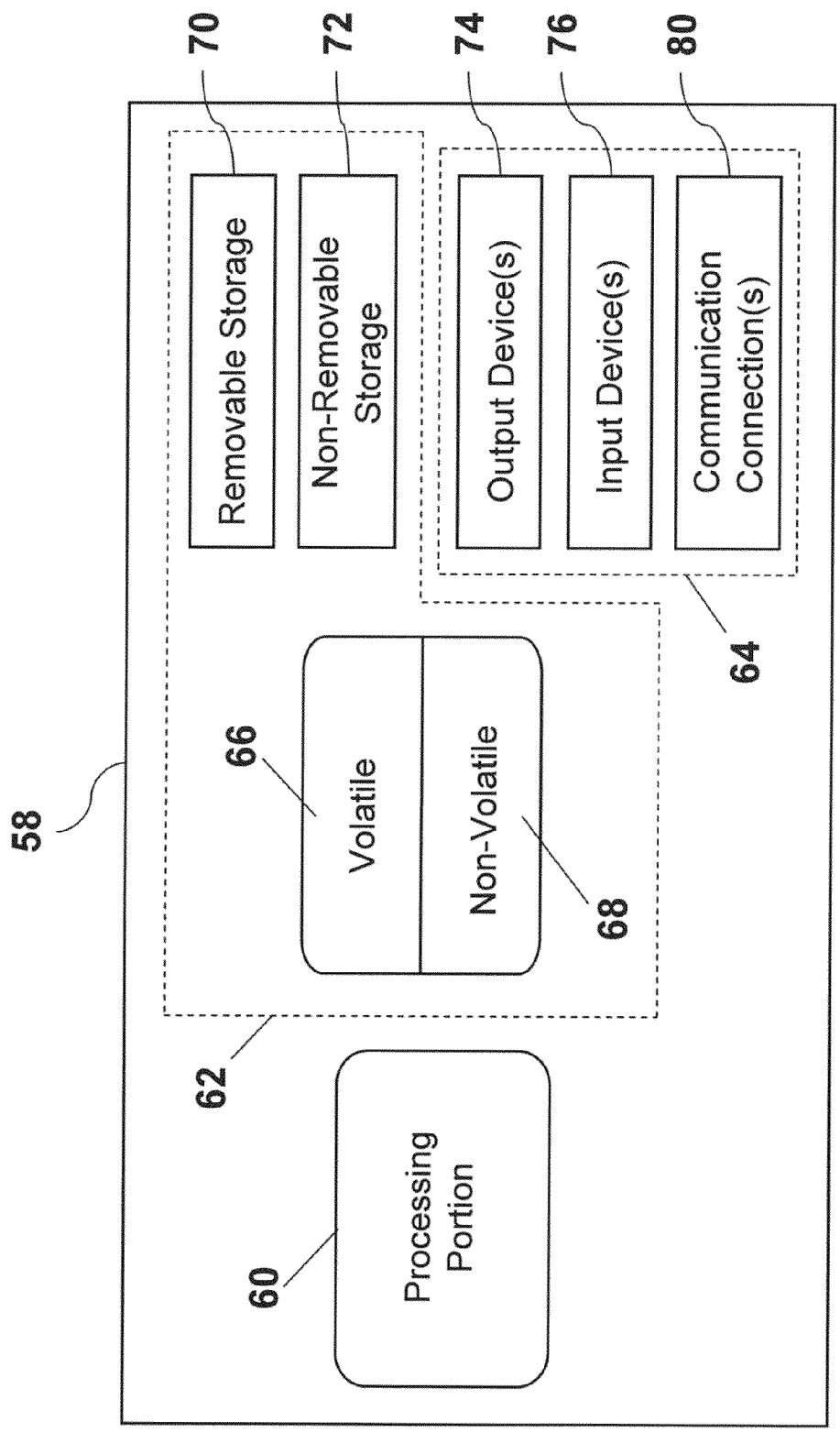
FIG. 3 is a block diagram of an example processor for generating a request for and/or receiving a reporting of traffic information.

FIG. 3 is a block diagram of an example processor 58 for generating a request for and/or receiving a report for traffic information which may be found in an exemplary mobile device 26. It is emphasized that the block diagram depicted in FIG. 3 is exemplary and not intended to imply a specific implementation. Thus, the processor 58 can be implemented in a single processor or multiple processors. Multiple processors can be distributed or centrally located. Multiple processors can communicate wirelessly, via hard wire, or a combination thereof.

The processor 58 comprises a processing portion 60, a memory portion 62, and an input/output portion 64. The processing portion 60, memory portion 62, and input/output portion 64 are coupled together (coupling not shown in FIG. 3) to allow communications therebetween. The input/output portion 64 is capable of providing and/or receiving components utilized to generate a request for and/or receiving a report of traffic information as outlined above. For example, as described above, the input/output portion 64 is capable of generating a request for and/or receive a report of traffic information, a request to a database for determining the history of traffic information, alert messages regarding traffic information with or without free form text or characters, or a combination thereof. The processing portion 60 is capable of parsing and analyzing a received alert message, generating a request for and/or receiving a report of traffic information, or a combination thereof, as described above.

The processor 58 can be implemented as a client processor and/or a server processor. In a basic configuration, the processor 58 can include at least one processing portion 60 and memory portion 62. The memory portion 62 can store any information utilized in conjunction with requesting and/or generating reports related to traffic information. Depending upon the exact configuration and type of processor, the memory portion 62 can be volatile (such as RAM) 66, non-volatile (such as ROM, flash memory, etc.) 68, or a combination thereof. The processor 58 can have additional features/functionality. For example, the processor 58 can include additional storage (removable storage 70 and/or non-removable storage 72) including, but not limited to, magnetic or optical disks, tape, flash, smart cards or a combination thereof Computer storage media, such as memory portion 62, 70, 72, 66, and 68, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 58. Any such computer storage media can be part of the processor 58.

The processor 58 can also contain communications connection(s) 80 that allow the processor 58 to communicate with other devices, for example. Communications connection(s) 80 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The processor 58 also can have input device(s) 76 such as keyboard, mouse, pen, voice input device, touch input device, etc. Output device(s) 74 such as a display, speakers, printer, etc. also can be included.

The following description sets forth some exemplary telephony radio networks and non-limiting operating environments in which predetermined emergency alert messages can be implemented. The below-described operating environments should be considered non-exhaustive, however, and thus the below-described network architectures merely show how traffic information requests and report generation may be incorporated into existing network structures and architectures. It can be appreciated, however, that such traffic information requests and report generation may be incorporated into existing and/or future alternative architectures for communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time.

Figure 4:
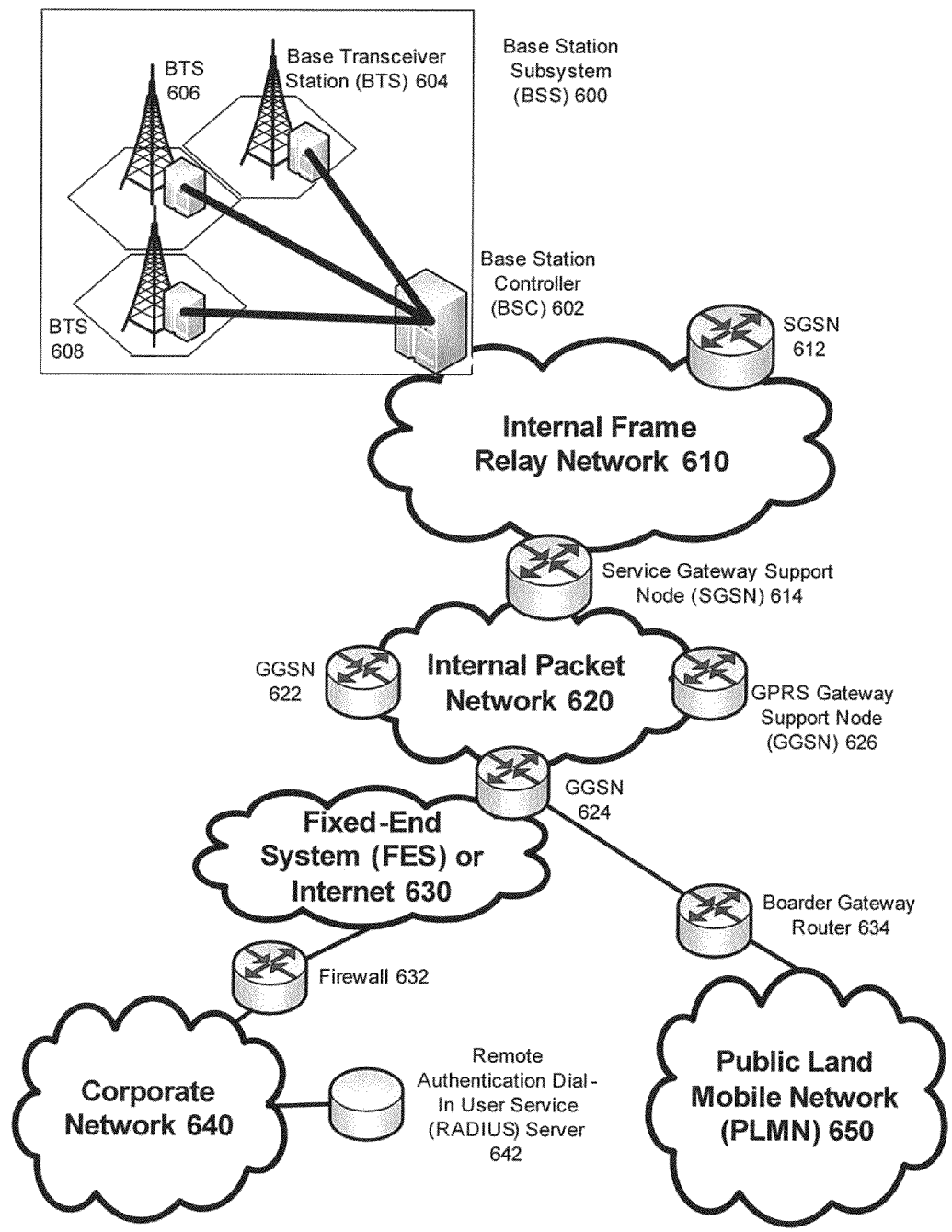
FIG. 4 depicts an overall block diagram of an exemplary packet-based mobile cellular network environment, such as a GPRS network, in which traffic gathering and reporting may be practiced.

FIG. 4 depicts an overall block diagram of an exemplary packet-based mobile cellular network environment, such as a GPRS network, in which the present invention can be practiced. In an example configuration, the cellular radio network 34 and towers 36 are encompassed by the network environment depicted in FIG. 4. In such an environment, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices (e.g., mobile device 12) become connected to the wireless network. In exemplary fashion, the packet traffic originating from user devices (e.g., user device 60) is transported via an over-the-air interface to a BTS 608, and from the BTS 608 to the BSC 602. Base station subsystems, such as BSS 600, are a part of internal frame relay network 610 that can include Service GPRS Support Nodes ("SGSN") such as SGSN 612 and 614. Each SGSN is connected to an internal packet network 620 through which a SGSN 612, 614, etc. can route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via border gateway router 634. The Remote Authentication Dial-In User Service ("RADIUS") server 642 may be used for caller authentication when a user of a mobile cellular device calls corporate network 640.

Generally, there can be five different cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 5:
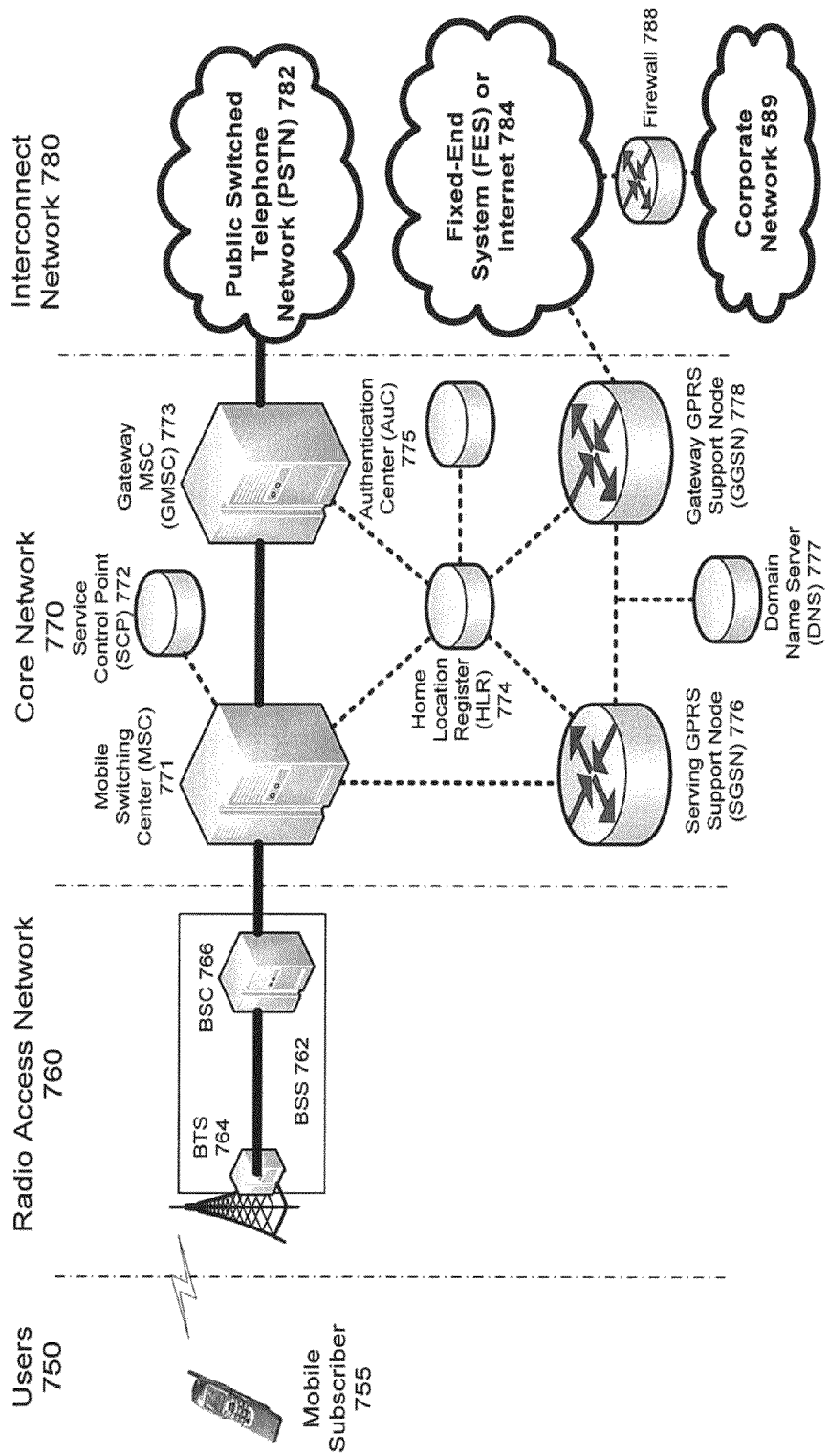
FIG. 5 illustrates an architecture of a typical GPRS network as segmented into four groups.

FIG. 5 illustrates an architecture of a typical GPRS network as segmented into four groups: users 750, radio access network 760, core network 770, and interconnect network 780. In an example configuration the emergency alert network 110, and the wireless broadcast network 116 are encompassed by the radio access network 760, core network 770, and interconnect network 780. Users 750 comprise a plurality of end users (though only mobile subscriber 755 is shown in FIG. 5). In an example embodiment, the device depicted as mobile subscriber 755 comprises mobile device 12. Radio access network 760 comprises a plurality of base station subsystems such as BSSs 762, which include BTSs 764 and BSCs 766. Core network 770 comprises a host of various network elements. As illustrated here, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 5, interconnect network 780 comprises Public Switched Telephone Network ("PSTN") 782, Fixed-End System ("FES") or Internet 784, firewall 788, and Corporate Network 789.

A mobile switching center can be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example, from BSC 766, it sends a query to a database hosted by SCP 772. The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as the mobile device 26, used by an end user of the mobile cellular service. When a mobile subscriber turns on his or her mobile device, the mobile device goes through an attach process by which the mobile device attaches to an SGSN of the GPRS network. In FIG. 5, when mobile subscriber 755 initiates the attach process by turning on the network capabilities of the mobile device, an attach request is sent by mobile subscriber 755 to SGSN 776. The SGSN 776 queries another SGSN, to which mobile subscriber 755 was attached before, for the identity of mobile subscriber 755. Upon receiving the identity of mobile subscriber 755 from the other SGSN, SGSN 776 requests more information from mobile subscriber 755. This information is used to authenticate mobile subscriber 755 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 755 was attached before, to cancel the location process for mobile subscriber 755. HLR 774 then notifies SGSN 776 that the location update has been performed. At this time, SGSN 776 sends an Attach Accept message to mobile subscriber 755, which in turn sends an Attach Complete message to SGSN 776.

After attaching itself with the network, mobile subscriber 755 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 755. The mobile subscriber 755 uses an algorithm to send the user identification (ID) and password to SGSN 776. The SGSN 776 uses the same algorithm and compares the result. If a match occurs, SGSN 776 authenticates mobile subscriber 755.

Next, the mobile subscriber 755 establishes a user session with the destination network, corporate network 789, by going through a Packet Data Protocol ("PDP") activation process. Briefly, in the process, mobile subscriber 755 requests access to the Access Point Name ("APN"), for example, UPS.com (e.g., which can be corporate network 789 in FIG. 5) and SGSN 776 receives the activation request from mobile subscriber 755. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 can access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 755.

Once activated, data packets of the call made by mobile subscriber 755 can then go through radio access network 760, core network 770, and interconnect network 780, in a particular fixed-end system or Internet 784 and firewall 788, to reach corporate network 789.

Thus, network elements that can invoke the functionality of the present invention can include but are not limited to Gateway GPRS Support Node tables, Fixed End System router tables, firewall systems, VPN tunnels, and any number of other network elements as required by the particular digital network.

Figure 6:
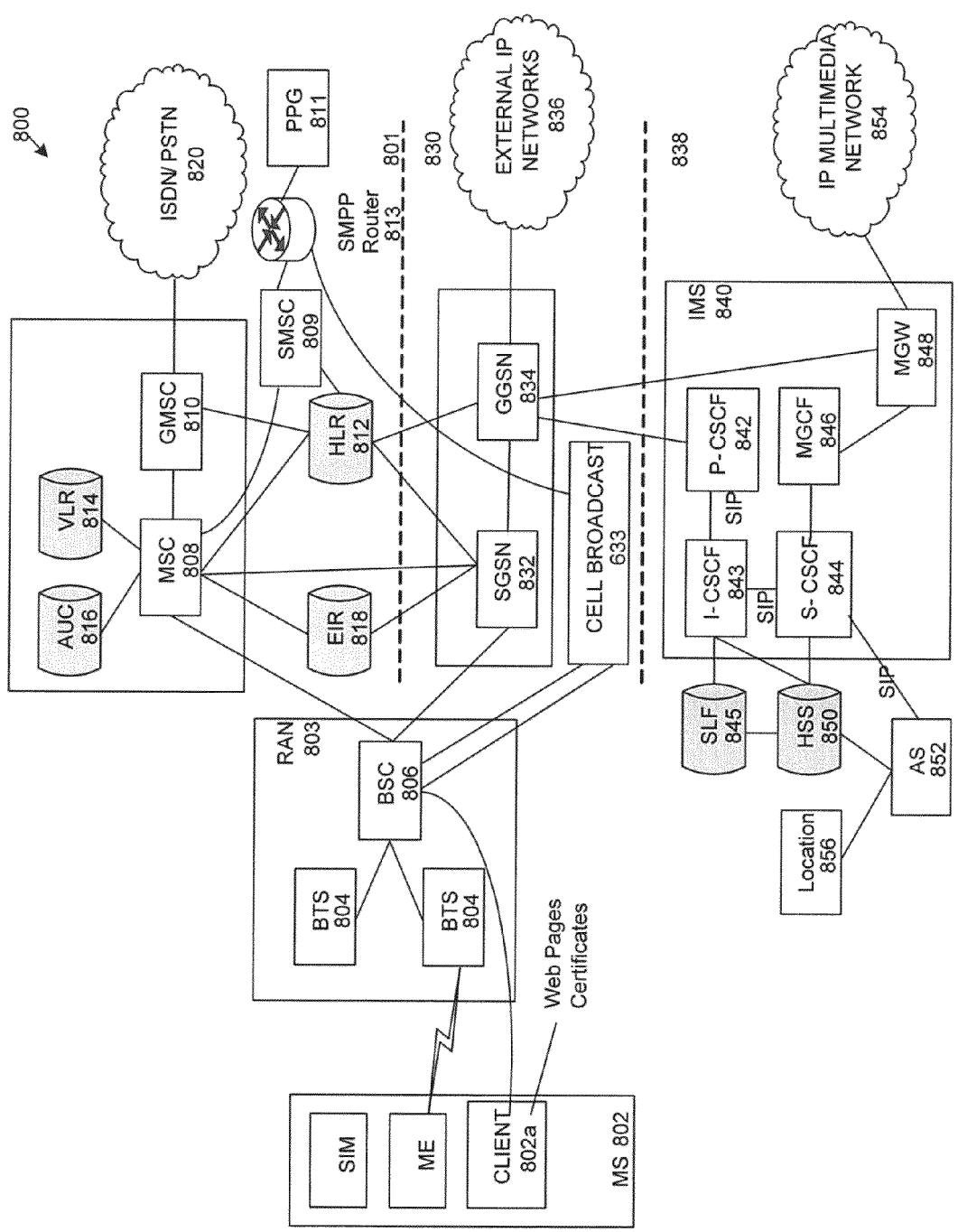
FIG. 6 illustrates an example alternate block diagram of an exemplary GSM/GPRS/IP multimedia network architecture in traffic gathering and reporting may be practiced.

FIG. 6 illustrates another exemplary block diagram view of a GSM/GPRS/IP multimedia network architecture 800 in which the present invention may be incorporated. As illustrated, architecture 800 of FIG. 6 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer (e.g., mobile device 12) that is used by mobile subscribers, with a Subscriber identity Module (SIM). The SIM includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AuC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 833 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides interworking functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 830 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 838 was introduced with 3GPP Release 5, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification).

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber, if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown). It also controls the media gateway (MGW) 848 that provides user-plane interworking functionality (e.g., converting between AMR- and PCM-coded voice). The MGW 848 also communicates with other IP multimedia networks 854.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of traffic information gathering and reporting been described in connection with various computing devices, the underlying concepts can be applied to any computing device or system capable of implementing predetermined emergency alert messages. The various techniques described herein can be implemented in connection with hardware or software or, where appropriate, with a combination of both. Thus, the methods and apparatus for requesting and/or receiving traffic information, alerts, messages, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing the present invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

Customer benefits include things like better automobile and pedestrian traffic data as well as other uses like demographic trend data. For example, the present invention could be used to calculate the average speed on 400 North or could be used to calculate the number of 18-34 year olds who are near a potential store site on weekends.

While the present invention has been described in connection with the various embodiments of the various figures, it is to be understood that other similar embodiments can be used or modifications and additions can be made to the described embodiment for performing the same function without deviating therefrom. For example, one skilled in the art will recognize that the requesting of traffic data and the generation of traffic reports as described in the present application may apply to any environment, whether wired or wireless, and may be applied to any number of such devices connected via a communications network and interacting across the network. Therefore, the method and system of the present invention should not be limited to any single embodiment, but rather should be construed in breadth and scope in accordance with the appended claims.

What is claimed:

1. A method comprising:
   selecting a geographic area of interest;
   determining a sample size of mobile handset devices from the selected geographic area of interest;
   establishing search criteria based at least in part upon demographic data and the determined sample size;
   collecting traffic information only from the geographic area of interest based on the established search criteria;
   deriving aggregated real time traffic data from the collected traffic information, wherein the aggregated real time traffic data comprise at least on of vehicle related data or pedestrian related data;
   generating a traffic report based on the derived traffic data;
   determining an intended recipient of the traffic report based on a the derived traffic data; and
   providing the traffic report to the intended recipient.

2. The method of claim 1 wherein the sample size is determined based on a total volume of traffic information available.

3. The method of claim 1, further comprising:
   determining the intended recipient of the traffic report based on the calculated traffic data and a proximity of an establishment to the intended recipient.

4. The method of claim 3, wherein the traffic report comprises an advertisement pertaining to the establishment.

5. The method of claim 1 wherein the traffic report comprises information pertaining to foot traffic.

6. The method of claim 1 further comprising receiving a request for the traffic report.

7. The method of claim 6 wherein the selecting, the establishing, the collecting, the calculating and the generating steps are performed in response to receiving the request for the traffic report.

8. The method of claim 1 further comprising comparing the traffic data to historical traffic data, wherein the traffic report includes comparative traffic data.

9. A method comprising:
   receiving a request for a traffic report from a mobile handset, wherein the request includes a geographic area and search criteria;
   determining a sample size of mobile handset devices from the geographic area;
   collecting traffic information only from the geographic area based on the request and the search criteria, wherein the collected traffic information is based at least in part on demographic data and the determined sample size;
   deriving aggregated real time traffic data from the collected traffic information, wherein the aggregated real time traffic data comprise at least on of vehicle related data or pedestrian related data;
   generating the traffic report from the derived traffic data; and
   delivering the traffic report to the mobile handset.

10. The method of claim 9, further comprising:
    determining an intended recipient of the traffic report based on a the calculated traffic data and a proximity of an establishment to the intended recipient; and
    providing the traffic report to the intended recipient.

11. A device comprising:
    a processor; and
    memory coupled to the processor, the memory comprising executable instructions that when executed by the processor, cause the processor to effectuates operations comprising:
    selecting a geographic area of interest;
    determining a sample size of mobile handset devices from the selected geographic area of interest;
    establishing search criteria based at least in part upon demographic data and the determined sample size;
    collecting traffic information only from the geographic area of interest based on the established search criteria;
    deriving aggregated real time traffic data from the collected traffic information, wherein the aggregated real time traffic data comprise at least on of vehicle related data or pedestrian related data;
    generating a traffic report based on the derived traffic data;
    determining an intended recipient of the traffic report based on a the derived traffic data; and
    providing the traffic report to the intended recipient.

12. The device of claim 11, the operation further comprising:
    determining an intended recipient of the traffic report based on a the calculated traffic data and a proximity of an establishment to the intended recipient; and
    providing the traffic report to the intended recipient.

13. The device of claim 12, wherein the traffic report comprises an advertisement pertaining to the establishment.

14. The device of claim 11, wherein the traffic information comprises information pertaining to foot traffic.

15. The device of claim 11, wherein the traffic report comprises information pertaining to foot traffic.

16. The method of claim 9, wherein the traffic report comprises information pertaining to foot traffic.

* * * * *